United States Patent
Wang et al.

(10) Patent No.: US 9,788,007 B2
(45) Date of Patent: Oct. 10, 2017

(54) PROFILE, TIER, LEVEL FOR THE 0-TH OUTPUT LAYER SET IN VIDEO CODING

(71) Applicant: QUALCOMM Incorporated, San Diego, CA (US)

(72) Inventors: Ye-Kui Wang, San Diego, CA (US); Adarsh Krishnan Ramasubramonian, San Diego, CA (US); Fnu Hendry, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 123 days.

(21) Appl. No.: 14/743,512

(22) Filed: Jun. 18, 2015

(65) Prior Publication Data

US 2015/0373361 A1     Dec. 24, 2015

Related U.S. Application Data

(60) Provisional application No. 62/015,210, filed on Jun. 20, 2014.

(51) Int. Cl.
    *H04N 19/52*     (2014.01)
    *H04N 19/124*    (2014.01)
    (Continued)

(52) U.S. Cl.
    CPC ........... *H04N 19/52* (2014.11); *H04N 19/124* (2014.11); *H04N 19/152* (2014.11); *H04N 19/172* (2014.11); *H04N 19/174* (2014.11); *H04N 19/176* (2014.11); *H04N 19/182* (2014.11); *H04N 19/187* (2014.11); *H04N 19/30* (2014.11); *H04N 19/573* (2014.11);
    (Continued)

(58) Field of Classification Search
    CPC ....................................................... H04N 19/82
    See application file for complete search history.

(56) References Cited

U.S. PATENT DOCUMENTS

| | | |
|---|---|---|
| 2014/0092988 A1 | 4/2014 | Deshpande |
| 2014/0211849 A1 | 7/2014 | Deshpande |

(Continued)

OTHER PUBLICATIONS

Hannuksela (Nokia) M M: "MV-HEVC/SHVC HLS: On non-HEVC base layer", 16. JCT-VC Meeting; Sep. 1, 2014-Jan. 17, 2014; San Jose; (Joint Collaborative Team on Video Coding of ISO/IEC JTC1/SC29/WG11 and ITU-T SG.16 ); No. JCTVC-P0140, Jan. 3, 2014, XP030115650, URL: http://wftp3.itu.int/av-arch/jctvc-site/.

(Continued)

*Primary Examiner* — Obafemi Sosanya
(74) *Attorney, Agent, or Firm* — Procopio, Cory, Hargreaves & Savitch LLP

(57) ABSTRACT

Systems and methods for encoding a decoding video data are disclosed. The method for decoding video data can include receiving a bitstream having a plurality of layers of video data. The plurality of layers of video data can include a base layer and a video parameter set (VPS). The VPS can indicate a plurality of output layer sets (OLS) and profile, tier, and level (PTL) information for each OLS of the plurality of OLSs, including the $0^{th}$ OLS. The method for decoding can also include selecting an OLS from the one or more layers as a target OLS, and decoding the target OLS based on PTL information signaled in the VPS.

12 Claims, 5 Drawing Sheets

(51) Int. Cl.
*H04N 19/152* (2014.01)
*H04N 19/597* (2014.01)
*H04N 19/176* (2014.01)
*H04N 19/187* (2014.01)
*H04N 19/172* (2014.01)
*H04N 19/174* (2014.01)
*H04N 19/182* (2014.01)
*H04N 19/573* (2014.01)
*H04N 19/58* (2014.01)
*H04N 19/70* (2014.01)
*H04N 19/30* (2014.01)

(52) U.S. Cl.
CPC .......... *H04N 19/58* (2014.11); *H04N 19/597* (2014.11); *H04N 19/70* (2014.11)

(56) References Cited

U.S. PATENT DOCUMENTS

2014/0301451 A1* 10/2014 Deshpande .......... H04N 19/597 375/240.12
2014/0301477 A1* 10/2014 Deshpande .......... H04N 19/82 375/240.25
2015/0373377 A1 12/2015 Wang

OTHER PUBLICATIONS

International Search Report and Written Opinion—PCT/US2015/036614—ISA/EPO—Sep. 24, 2015.

Tech G., et al., "MV-HEVC Draft Text 8", 8. JCT-3V Meeting; Mar. 29, 2014-Apr. 4, 2014; Valencia; (The Joint Collaborative Team on 3D Video Coding Extension Development of ISO/IEC JTC1/SC29/WG11 and ITU-T SG.16 ); URL: http://phenix.int-evry.fr/jct3v/ ,, No. JCT3V-H1002-v5, Jun. 3, 2014, XP030132292, 163 pages.

Wang Y-K., et al., "MV-HEVC/SHVC HLS: Miscellaneous Cleanups", 18. JCT-VC Meeting; Jun. 30, 2014-Jul. 9, 2014; Sapporo; (Joint Collaborative Team on Video Coding of ISO/IEC JTC1/SC29/WG11 and ITU-T SG.16); URL: http://wftp3.itu.int/av-arch/jctvc-site/, No. JCTVC-R0227, Jun. 21, 2014 (Jun. 21, 2014), pp. 1-6, XP03116527, section 1.3.

* cited by examiner

PROFILE, TIER, LEVEL FOR THE 0-TH OUTPUT LAYER SET IN VIDEO CODING

INCORPORATION BY REFERENCE TO ANY PRIORITY APPLICATIONS

This application claims the benefit of U.S. Provisional Application No. 62/015,210, filed Jun. 20, 2014, entitled "PROFILE, TIER, LEVEL FOR THE 0-TH OUTPUT LAYER SET AND VALUE RANGES OF SYNTAX ELEMENTS IN VIDEO CODING," which is incorporated by reference in its entirety.

BACKGROUND

Technological Field

This application relates to the field of video coding and compression, for example, in video encoders and video decoders. In particular, this application relates to scalable video coding (SVC), including SVC for Advanced Video Coding (AVC), and SVC for High Efficiency Video Coding (HEVC), also referred to as Scalable HEVC (SHVC), in addition to 3D and multi-view extensions to HEVC.

Background

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding processes, such as those described in the standards defined by MPEG-2, MPEG-4, ITU-T H.263, ITU-T H.264/MPEG-4, Part 10, Advanced Video Coding (AVC), the (HEVC standard presently under development, and extensions of such standards. The video devices may transmit, receive, encode, decode, and/or store digital video information more efficiently by implementing such types of video coding.

Video coding methods include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

A multi-view coding bitstream may be generated by encoding views, e.g., from multiple perspectives. Some three-dimensional (3D) video standards have been developed that make use of multiview coding aspects. For example, different views may transmit left and right eye views to support 3D video. Alternatively, some 3D video coding processes may apply so-called multiview plus depth coding. In multiview plus depth coding, 3D video bitstream may contain not only texture view components, but also depth view components. For example, each view may comprise one texture view component and one depth view component.

SUMMARY

In general, this disclosure describes methods and systems related to video coding, and more particularly to HEVC. In the current SHVC and MV-HEVC standards, the $0^{th}$ output layer set (OLS) specified by the active video parameter set (VPS) refers to the OLS that contains only the base layer of video data. However, unless the entire bitstream contains only the base layer, the tier and level information of the $0^{th}$ OLS is not signaled. This prevents the video coding system from operating at an optimum level in HEVC.

The systems, methods, and devices of this disclosure each have several innovative aspects, no single one of which is solely responsible for the desirable attributes disclosed herein.

One aspect of the disclosure provides a method for encoding a bitstream having a plurality of layers of video data, the plurality of layers of video data including a base layer. The method can include generating one or more syntax elements indicating a plurality of output layer sets (OLS) within the bitstream. Each OLS can have one or more layers of the plurality of layers. The syntax elements can also indicate profile, tier, and level (PTL) information for each OLS of the plurality of OLSs. The method can also include encoding the plurality of layers including encoding the one or more syntax elements in a video parameter set (VPS).

Another aspect of the disclosure provides a device for encoding a bitstream having a plurality of layers of video data, the plurality of layers of video data including a base layer. The device can have a memory configured to store the plurality of layers of video data. The device can also have at least one processor operably coupled to the memory. The at least one processor can generate one or more syntax elements indicating a plurality of output layer sets (OLS) within the bitstream. Each OLS can have one or more layers of the plurality of layers. The syntax elements can also indicate profile, tier, and level (PTL) information for each OLS of the plurality of OLSs. The at least one processor can also encode the plurality of layers including encoding the one or more syntax elements in a video parameter set (VPS).

Another aspect of the disclosure provides a method for decoding video data. The method can include receiving a bitstream having a plurality of layers of video data. The plurality of layers of video data can include a base layer and a video parameter set (VPS). The VPS can indicate a plurality of output layer sets (OLS) and profile, tier, and level (PTL) information for each OLS of the plurality of OLSs. The method can also include selecting an OLS from the one or more layers as a target OLS. The method can also include decoding the target OLS based on PTL information signaled in the VPS.

Another aspect of the disclosure provides a device for decoding video data. The device can include a memory configured to store a bitstream having a plurality of layers of video data. The plurality of layers of video data can include a base layer and a video parameter set (VPS). The VPS can indicate a plurality of output layer sets (OLS) and profile, tier, and level (PTL) information for each OLS of the plurality of OLSs. The device can also have at least one processor operably coupled to the memory. The at least one processor can select an OLS from the one or more layers as a target OLS. The at least one processor can also decode the target OLS based on PTL information signaled in the VPS.

Other features and advantages of the present disclosure should be apparent from the following description which illustrates, by way of example, aspects of the disclosure.

DESCRIPTION OF THE DRAWINGS

The details of embodiments of the present disclosure, both as to their structure and operation, may be gleaned in part by study of the accompanying drawings, in which like reference numerals refer to like parts, and in which.

DETAILED DESCRIPTION

The disclosure provides systems and methods of coding that may include one or more of several improvements in multi-layer video coding, including the signaling of interoperability information such as profile, tier, and level for the $0^{th}$ output layer set (OLS). As used herein, the "$0^{th}$ layer" can generally refer to the base layer of a bitstream. In the current SHVC and MV-HEVC standards, the $0^{th}$ OLS specified by the active VPS refers to the OLS that contains only the base layer. However, unless the entire bitstream contains only the base layer, the tier and level information of the $0^{th}$ OLS is not signaled.

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Video Coding System

Figure 1:
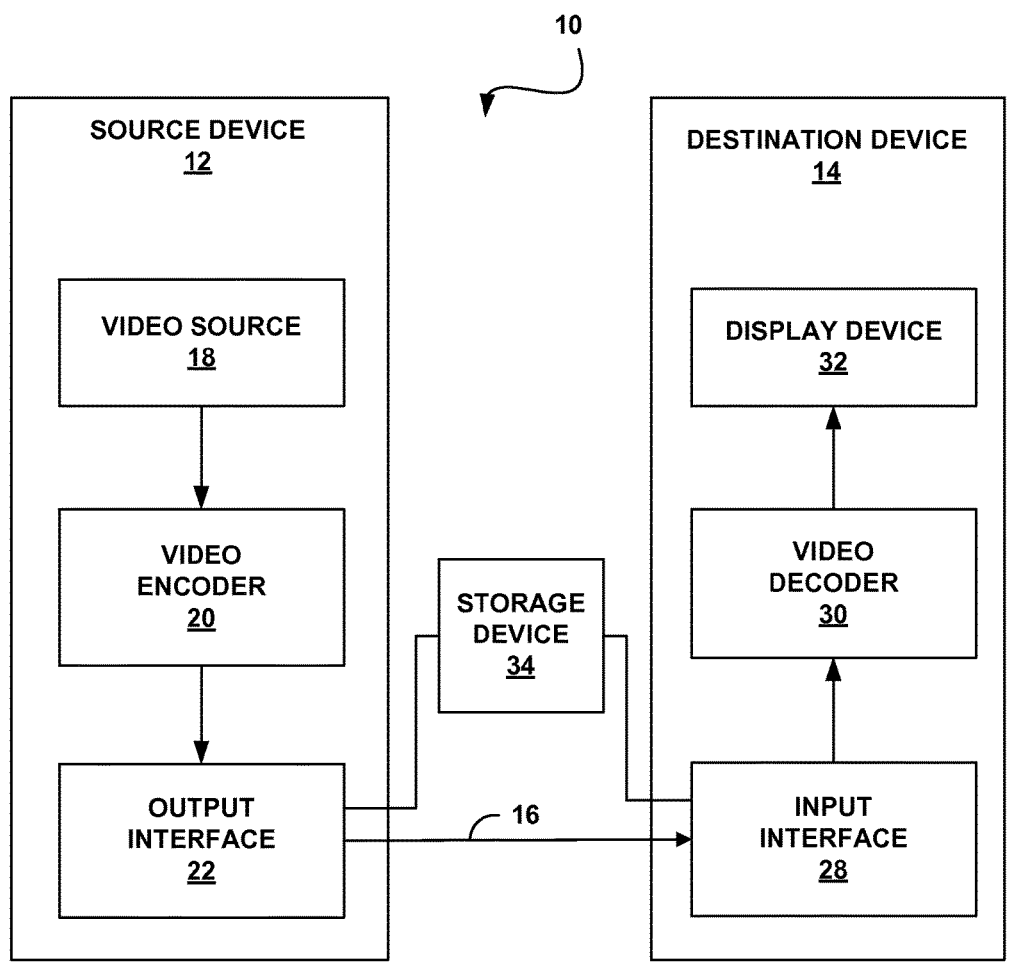
FIG. 1 is a functional block diagram of a video coding system.

FIG. 1 is a functional block diagram of a video coding system. A video coding system ("system") 10 that may utilize methods in accordance with aspects described in this disclosure. As used described herein, the term "video coder" refers generically to both video encoders and video decoders. In this disclosure, the terms "video coding" or "coding" may refer generically to video encoding and video decoding.

As shown in FIG. 1, the system 10 includes a source device 12 that can generate encoded video data to be decoded at a later time by a destination device 14. The source device 12 and the destination device 14 can comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

The destination device 14 may receive the encoded video data to be decoded via a link 16. The link 16 may comprise any type of medium or device capable of moving the encoded video data from the source device 12 to the destination device 14. In one example, the link 16 may comprise a communication medium to enable source device 12 to transmit encoded video data directly to the destination device 14 in real-time. The source device 12 may modulate the encoded video data according to a communication standard, such as a wireless communication protocol, and transmitted to the destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device 12 to the destination device 14.

Encoded data may be output from the output interface 22 to a storage device 34. Similarly, encoded data may be accessed from the storage device 34 by the input interface. The storage device 34 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device 34 may correspond to a file server or another intermediate storage device that may hold the encoded video generated by the source device 12. The destination device 14 may access stored video data from the storage device 34 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device 34 may be a streaming transmission, a download transmission, or a combination of both.

The methods of this disclosure are not necessarily limited to wireless applications or settings. The methods may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, the source device 12 includes a video source 18, video encoder 20, and an output interface 22. In some cases, the output interface 22 may include a modulator/demodulator (modem) and/or a transmitter. In the source device 12, the video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera, the source device 12 and destination device 14 may form so-called camera phones or video phones. However, the methods described in this disclosure may be applicable to video coding in general, and may be applied to wireless and/or wired applications.

The video encoder 20 may encode the captured, pre-captured, or computer-generated video. Additionally, in some embodiments, the video decoder 30 may differentiate between a first bitstream and a second bitstream based on the parameter set ID of the first bitstream and the unique parameter set ID. In other examples, output interface 22 of the source device 12 may transmit the encoded video data directly to the destination device 14 via the link 16. The encoded video data may also (or alternatively) be stored onto the storage device 34 for later access by the destination device 14 or other devices, for decoding and/or playback.

The destination device 14 includes an input interface 28, a video decoder 30, and a display device 32. In some cases, the input interface 28 may include a receiver and/or a modem. The input interface 28 of the destination device 14 receives the encoded video data over the link 16. The encoded video data communicated over the link 16, or provided on the storage device 34, may include a variety of syntax elements generated by the video encoder 20 for use by a video decoder, such as the video decoder 30, in decoding the video data. Such syntax elements may be included with the encoded video data transmitted on a communication medium, stored on a storage medium, or stored a file server.

The display device 32 may be integrated with, or external to, the destination device 14. In some examples, the destination device 14 may include an integrated display device and also be configured to interface with an external display device. In other examples, the destination device 14 may be a display device. In general, the display device 32 displays the decoded video data to a user, and may comprise any of a variety of display devices such as a liquid crystal display (LCD), a plasma display, an organic light emitting diode (OLED) display, or another type of display device.

The video encoder 20 and the video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the methods are implemented partially in software, a device may store instructions for the software in a suitable, non-transitory computer-readable medium and execute the instructions in hardware using one or more processors to perform the methods of this disclosure. Each of the video encoder 20 and the video decoder 30 may be included in one or more encoders or decoders, either of which may be integrated as part of a combined encoder/decoder (CODEC) in a respective device.

The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

In general, the working model of the HM describes that a video frame or picture may be divided into a sequence of treeblocks or largest coding units (LCU) that include both luma and chroma samples. A treeblock has a similar purpose as a macroblock of the H.264 standard. A slice includes a number of consecutive treeblocks in coding order. A video frame or picture may be partitioned into one or more slices. Each treeblock may be split into coding units (CUs) according to a quadtree. For example, a treeblock, as a root node of the quadtree, may be split into four child nodes, and each child node may in turn be a parent node and be split into another four child nodes. A final, unsplit child node, as a leaf node of the quadtree, comprises a coding node, i.e., a coded video block. Syntax data associated with a coded bitstream may define a maximum number of times a treeblock may be split, and define a minimum size of the coding nodes.

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square in shape.

The HEVC standard allows for transformations according to TUs, which may be different for different CUs. The TUs can be sized based on the size of PUs within a given CU defined for a partitioned LCU, although this may not always be the case. The TUs can be the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

In general, a PU includes data related to the prediction process. For example, when the PU is intra-mode encoded, the PU may include data describing an intra-prediction mode for the PU. As another example, when the PU is inter-mode encoded, the PU may include data defining a motion vector for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

In general, a TU is used for the transform and quantization processes. A given CU having one or more PUs may also include one or more transform units (TUs). Following prediction, the video encoder 20 may calculate residual values corresponding to the PU. The residual values comprise pixel difference values that may be transformed into transform coefficients, quantized, and scanned using the TUs to produce serialized transform coefficients for entropy coding. As used herein, the term "video block" may generally refer to a coding node of a CU. In some specific cases, this disclosure may also use the term "video block" to refer to a treeblock, i.e., LCU, or a CU, which includes a coding node and PUs and TUs.

The video encoder 20 can generate a bitstream that includes encoded video data. The bitstream can include a series of network abstraction layer (NAL) units. Each of the NAL units may include a NAL unit header and may encapsulate a raw byte sequence payload (RBSP). The NAL unit header may include a syntax element that indicates a NAL unit type code. The NAL unit type code specified by the NAL unit header of a NAL unit indicates the type of the NAL unit. The NAL units of the bitstream may include video coding layer (VCL) NAL units and non-VCL NAL units. The VCL NAL units can include coded slices of pictures.

A non-VCL NAL unit may include a VPS, a sequence parameter set (SPS), a picture parameter set (PPS), SEI, or other types of data. A VPS is a syntax structure that may contain syntax elements that apply to zero or more entire coded video sequences. A SPS is a syntax structure that may contain syntax elements that apply to zero or more entire coded video sequences. A single VPS may be applicable to multiple SPSs. A PPS is a syntax structure that may contain syntax elements that apply to zero or more entire coded pictures. A single SPS may be applicable to multiple PPS's. Various aspects of the VPS, SPS, and PPS may be formed, in general, as defined by the HEVC standard. The video encoder 20 may use SEI messages to include, in the bitstream, metadata that is not required for correct decoding of the sample values of pictures. However, video decoder 30 or other devices may use the metadata included in SEI messages for various other purposes. For example, the video decoder 30 may use the metadata in SEI messages for picture output timing, picture displaying, loss detection, and error concealment.

High Level Syntax

The NAL units can contain syntax elements encoded by the video encoder 20 and transmitted to the video decoder 30. The syntax elements that describe the structure of the bitstream or provide information that applies to multiple pictures or to multiple coded block regions within a picture, such as the parameter sets (e.g., SPS, VPS, PPS, etc.), reference picture management syntax, and SEI messages, are known as "high-level syntax" (HLS) part of HEVC.

In particular, HEVC employs the following aspects, relevant to this disclosure:

Parameter Set Structure:

Parameter sets contain information that can be shared for the decoding of several regions of the decoded video. The parameter set structure provides a robust mechanism for conveying data that are essential to the decoding process.

Supplemental Enhancement Information (SEI):

The syntax includes support for various types of metadata known as SEI. Such data provide information about the timing of the video pictures, the proper interpretation of the color space used in the video signal, 3-D stereoscopic frame packing information, other display hint information, and so on.

Figure 2:
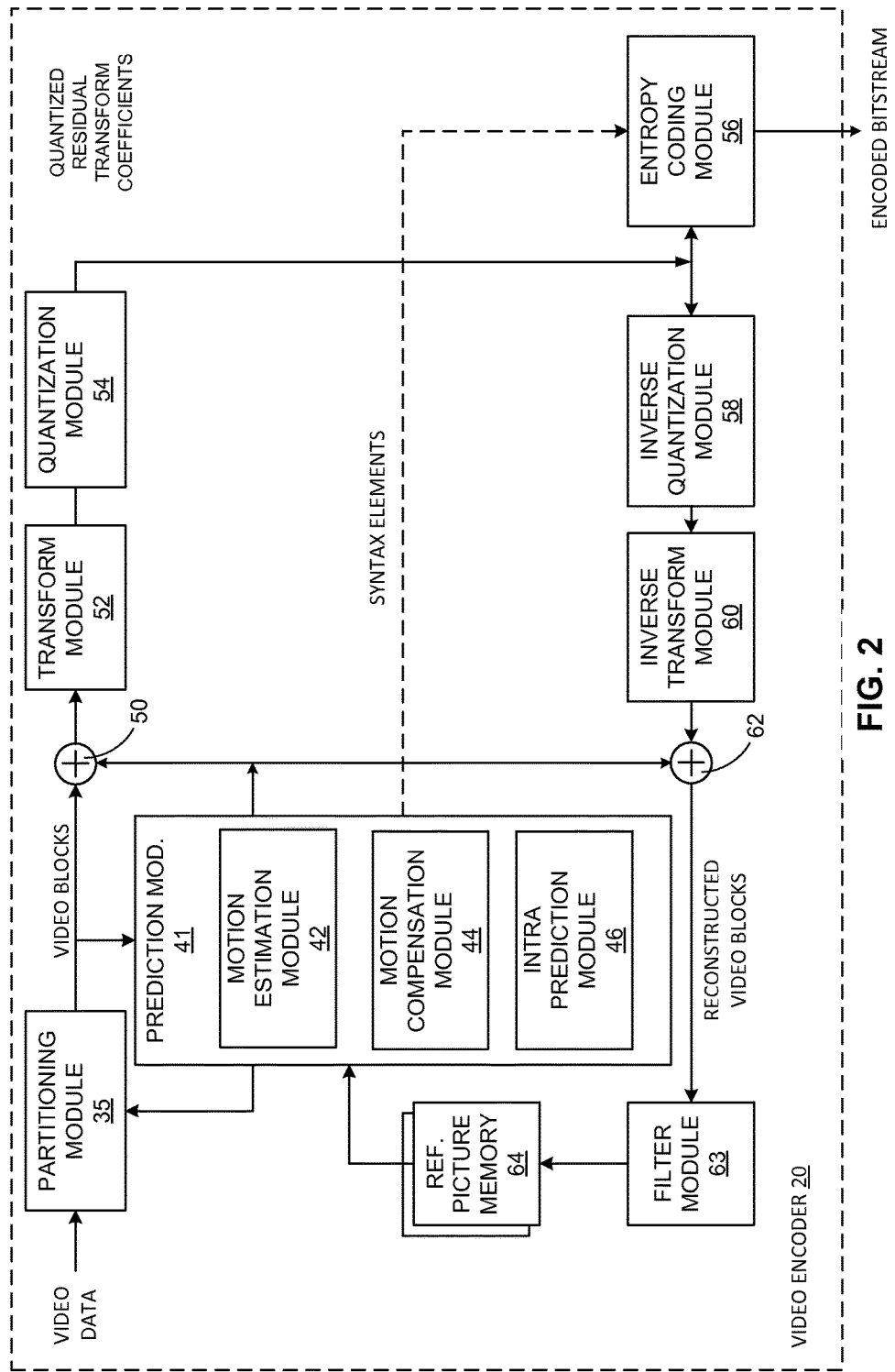
FIG. 2 is a functional block diagram of the video encoder of FIG. 1.

FIG. 2 is a functional block diagram of the video encoder of FIG. 1. The video encoder 20 can include a partitioning module 35 configured to receive captured video data and partition the video data into video blocks. The partitioning module 35 can partition the video data into slices, tiles, or other larger units. The partitioning module 35 can also partition video blocks, e.g., according to a quadtree structure of LCUs and CUs. The video encoder 20 may divide the slice into multiple video blocks (and possibly into sets of video blocks referred to as tiles).

The video encoder 20 can also have a prediction module 41 operably coupled to the partitioning module 35 and configured to receive the partitioned video data. The prediction module 41 can select one of a plurality of possible coding modes, such as one of a plurality of intra coding modes or one of a plurality of inter coding modes, for the current video block based on error results (e.g., coding rate and the level of distortion). The prediction module 41 can allow the video encoder 20 to perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

The prediction module 41 can include a motion estimation module 42, a motion compensation module 44, and an intra-prediction module 46. Each of these components can be operably connected or integrated in one or more processors within the video encoder 20. While discussed separately for conceptual purposes, the motion estimation module 42, the motion compensation module 44, and the intra-prediction module 46 can be highly integrated.

The motion estimation module 42 can be configured to determine the inter-prediction mode for a video slice according to a predetermined pattern for a video sequence. Such inter-prediction or inter-predictive coding of the current video block relative to one or more predictive blocks in one or more reference pictures can provide temporal compression. The predetermined pattern may designate video slices in the sequence as P slices, B slices or GPB slices. Motion estimation, as used herein, may generally refer to the process of generating motion vectors, which estimate motion for video blocks. A motion vector, for example, may indicate the displacement of a PU of a video block within a current video frame or picture relative to a predictive block within a reference frame or reference picture. The reference frames can be stored in a reference picture memory 64 operably coupled to the prediction module 41. The reference frame memory 64. The reference frame memory 64 can store reconstructed coding blocks after a filter module 63 performs deblocking operations on the reconstructed coding blocks. The reference frame memory 64 can thus also operate as a decoded picture buffer (DPB).

A predictive block is a block that is found to closely match the PU of the video block to be coded in terms of pixel difference, which may be determined by sum of absolute difference (SAD), sum of square difference (SSD), or other difference metrics. In some examples, the motion prediction module ("prediction module") 41 can calculate values for sub-integer pixel positions of reference pictures stored in the reference picture memory 64. For example, the prediction module 41 can interpolate values of one-quarter pixel positions, one-eighth pixel positions, or other fractional pixel positions of the reference picture. Therefore, the motion estimation module 42 may perform a motion search relative to the full pixel positions and fractional pixel positions and output a motion vector with fractional pixel precision.

The motion estimation module 42 can calculate a motion vector for a PU of a video block in an inter-coded slice by comparing the position of the PU to the position of a predictive block of a reference picture. The reference picture can be selected from a first reference picture list (List 0) or a second reference picture list (List 1), each of which identify one or more reference pictures stored in the reference picture memory 64. The motion estimation module 42 can send the calculated motion vector to the motion compensation module 44 and an entropy encoding module 56.

Motion compensation can involve fetching or generating the predictive block based on the motion vector determined by motion estimation. This can include interpolations to sub-pixel precision. Upon receiving the motion vector for the PU of the current video block, the motion compensation module 44 can locate the predictive block to which the motion vector points in one of the reference picture lists. The motion compensation module 44 can also generate syntax elements associated with the video blocks and the video slice for use by the video decoder 30 in decoding the video blocks of the video slice.

The intra-prediction module 46 of the prediction module 41 can perform intra-predictive coding of the current video block relative to one or more neighboring blocks in the same frame or slice to provide spatial compression. The intra-prediction module 46 can intra-predict a current block, as an alternative to the inter-prediction performed by the motion estimation module 42 and the motion compensation module 44, as described above. In particular, the intra-prediction module 46 can determine an intra-prediction mode to use to encode a current block. In some examples, the intra-prediction module 46 can encode a current block using various intra-prediction modes, e.g., during separate encoding passes. For example, the intra-prediction module 46 may calculate rate-distortion values using a rate-distortion analysis for the various tested intra-prediction modes, and select the intra-prediction mode having the best rate-distortion characteristics among the tested modes. Rate-distortion analysis can determine an amount of distortion (or error) between an encoded block and an original, unencoded block that was encoded to produce the encoded block, as well as a bit rate (that is, a number of bits) used to produce the encoded block. The intra-prediction module 46 may calculate ratios from the distortions and rates for the various encoded blocks to determine which intra-prediction mode exhibits the best rate-distortion value for the block.

The intra-prediction module 46 can provide information indicative of the selected intra-prediction mode for the block to the entropy encoding module 56. The entropy encoding module 56 can encode the information indicating the selected intra-prediction mode. The video encoder 20 can include configuration data in the transmitted bitstream, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

After the prediction module 41 generates the predictive block for the current video block via either inter-prediction or intra-prediction, the video encoder 20 forms a residual video block by subtracting the predictive block from the current video block. This process can result in pixel difference values. The pixel difference values form the residual data for the block, and can include both luma and chroma difference components. A summer 50, operably coupled to the prediction module 41 and the partitioning module 35, represents the component or components that can be configured to perform this subtraction operation.

The residual video data in the residual block may be included in one or more TUs and applied to a transform module 52 operably coupled to the summer 50. The transform module 52 can transform the residual video data into residual transform coefficients using a transform, such as a discrete cosine transform (DCT) or a conceptually similar transform. The transform module 52 can convert the residual video data from a pixel domain to a transform domain, such as a frequency domain. The prediction module 41 can provide the resulting intra- or inter-coded block to the summer 50 to generate residual block data. The resulting intra- or inter-coded block can further be provided a summer 62 to reconstruct the encoded block for use as a reference picture.

The video encoder 20 can also include the filter module 63 operably coupled to the summer 62. The filter module 63 can represent one or more loop filters such as a deblocking filter, an adaptive loop filter (ALF), and a sample adaptive offset (SAO) filter. Although filter module 63 is shown in FIG. 2 as being an in loop filter, in other configurations, the filter module 63 can be implemented as a post loop filter. The filter module 63 can provide reference pictures to the reference picture memory 64.

The transform module 52 can send the resulting transform coefficients to a quantization module 54. The quantization module 54 can quantize the transform coefficients to further reduce bit rate. The quantization process may reduce the bit depth associated with some or all of the coefficients. The degree of quantization may be modified by adjusting a quantization parameter. In some examples, the quantization module 54 can then perform a scan of the matrix including the quantized transform coefficients. In some embodiments, the entropy encoding module 56 may perform the scan.

Following quantization, the entropy encoding module 56 can entropy encode the quantized transform coefficients. For example, the entropy encoding module 56 may perform context adaptive variable length coding (CAVLC), context adaptive binary arithmetic coding (CABAC), syntax-based context-adaptive binary arithmetic coding (SBAC), Probability Interval Partitioning Entropy (PIPE) coding or another entropy encoding methodology. The video encoder 20 may also entropy encode syntax elements associated with the encoded video data for use by the video decoder 30 in decoding the video data.

Following the entropy encoding by the entropy encoding module 56, the encoded bitstream can be transmitted to the video decoder 30. The bitstream can also be archived for later transmission or retrieval by the video decoder 30. The entropy encoding module 56 can also entropy encode the motion vectors and the other syntax elements for the current video slice being coded.

The video encoder 20 can also include an inverse quantization module 58 operably coupled to the entropy encoding module 56. An inverse transform module 60 can also be operably coupled to the inverse quantization module 58 and the summer 62. The inverse quantization module 58 and the inverse transform module 60 can apply inverse quantization and inverse transformation, respectively, to reconstruct the residual block in the pixel domain for later use as a reference block of the reference picture. The motion compensation module 44 can calculate a reference block by adding the residual block to a predictive block of one of the reference pictures within one of the reference picture lists. The summer 62 can add the reconstructed residual block to the motion compensated prediction block produced by the motion compensation module 44 to produce a reference block for storage in the reference picture memory 64. The reference block can be used by the motion estimation module 42 and the motion compensation module 44 as a reference block to inter-predict a block in a subsequent video frame or picture.

In some examples, video encoder 20 generates a bitstream. The bitstream generated by the video encoder 20 may include multiple operation points that can be extracted as sub-bitstreams from the bitstream. The operation points may include, for example, multiple layers and/or views, as well as multiple frame rates. The video encoder 20 may encode information indicative of the output operation points in the VPS. As used herein an output operation point refers to an operation point for which the output layers (i.e. the set of layers to be output) are specified. In some examples, for each of the operation points that the video encoder 20 signals in the VPS associated with the bitstream, an operation point syntax structure specifies a set of layer identifiers (IDs) used to identify NAL units in the bitstream that belong to a sub-bitstream of a given operation point. In this way, NAL units that make up the sub-bitstream of the given operation point may be extracted from the original bitstream based on the layer identifiers of the NAL units.

Figure 3:
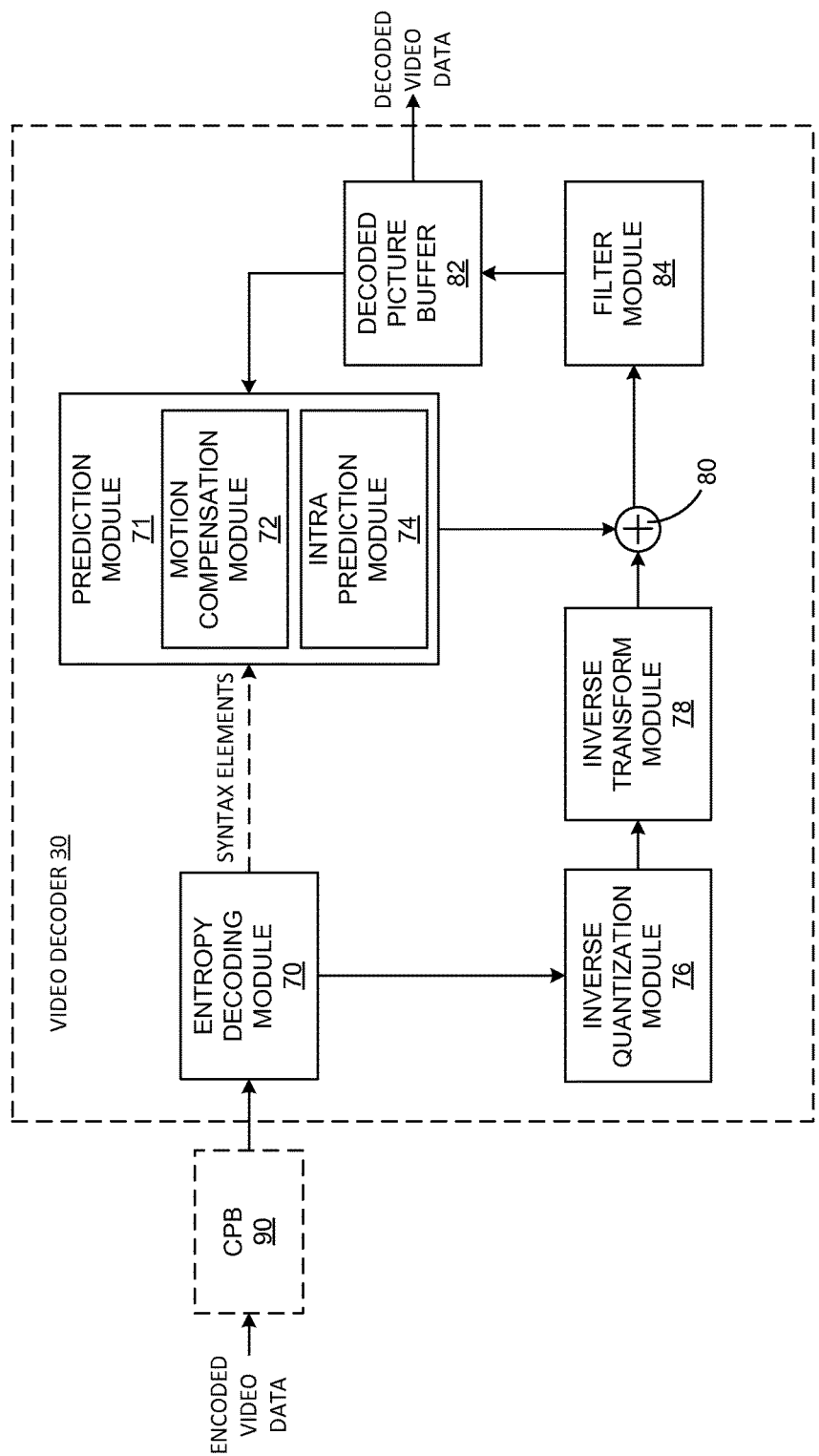
FIG. 3 is a functional block diagram illustrating the video decoder of FIG. 1.

FIG. 3 is a block diagram illustrating the video decoder of FIG. 1. For purposes of explanation, this disclosure describes video decoder 30 in the context of HEVC coding. However, this disclosure may be applicable to other coding standards or methods.

The video decoder 30 can include an entropy decoding module 70, a prediction module 71, an inverse quantization module 76, an inverse transform module 78, a summer 80, a filter module 84, and a decoded picture buffer (DPB) 82.

The prediction module 71 can include a motion compensation module 72 and an intra-prediction module 74. In other examples, the video decoder 30 can include more, fewer, or different functional components.

A coded picture buffer (CPB) 90 may receive and store encoded video data (e.g., NAL units) of a bitstream. The entropy decoding module 70 may receive NAL units from CPB 90 and parse the NAL units to decode syntax elements. The entropy decoding module 70 can entropy decode entropy-encoded syntax elements in the NAL units. The prediction module 71, the inverse quantization module 76, the inverse transform module 78, the summer 80, and the filter module 84 can generate decoded video data based on the syntax elements extracted from the bitstream.

The NAL units of the bitstream may include coded slice NAL units. As part of decoding the bitstream, the entropy decoding module 70 can extract and entropy decode syntax elements from the coded slice NAL units. Each of the coded slices can include a slice header and slice data. The slice header can contain syntax elements pertaining to a slice. The syntax elements in the slice header can include a syntax element that identifies a PPS associated with a picture that contains the slice.

In addition to decoding syntax elements from the bitstream, the video decoder 30 may perform a reconstruction operation on a non-partitioned CU. To perform the reconstruction operation on a non-partitioned CU, the video decoder 30 can perform a reconstruction operation on each TU of the CU. By performing the reconstruction operation for each TU of the CU, the video decoder 30 may reconstruct residual blocks of the CU.

As part of performing a reconstruction operation on a TU of a CU, inverse quantization module 76 can inverse quantize, i.e., de-quantize, coefficient blocks associated with the TU. Inverse quantization module 76 may use a quantization parameter (QP) value associated with the CU of the TU to determine a degree of quantization and, likewise, a degree of inverse quantization for inverse quantization module 76 to apply. That is, the compression ratio, i.e., the ratio of the number of bits used to represent original sequence and the compressed one, may be controlled by adjusting the value of the QP used when quantizing transform coefficients. The compression ratio may also depend on the method of entropy coding employed.

After inverse quantization module 76 inverse quantizes a coefficient block, inverse transform module 78 may apply one or more inverse transforms to the coefficient block in order to generate a residual block associated with the TU. For example, inverse transform module 78 may apply an inverse DCT, an inverse integer transform, an inverse directional transform, or another inverse transform to the coefficient block.

If a PU is encoded using intra prediction, intra-prediction module 74 can perform intra-prediction to generate predictive blocks for the PU. Intra-prediction module 74 may use an intra-prediction mode to generate the predictive luma, Cb and Cr blocks for the PU based on the prediction blocks of spatially-neighboring PUs. Intra-prediction module 74 may determine the intra prediction mode for the PU based on one or more syntax elements decoded from the bitstream.

The prediction module 71 can construct a first reference picture list (RefPicList0) and a second reference picture list (RefPicList1) based on syntax elements extracted from the bitstream. Furthermore, if a PU is encoded using inter prediction, entropy decoding module 70 may extract motion information for the PU. The motion compensation module 72 may determine, based on the motion information of the PU, one or more reference regions for the PU. The motion compensation module 72 can generate predictive luma, Cb and Cr blocks for the PU-based on samples blocks at the one or more reference blocks for the PU.

The summer 80 can use the luma, Cb and Cr transform blocks associated with TUs of a CU and the predictive luma, Cb and Cr blocks of the PUs of the CU, i.e., either intra-prediction data or inter-prediction data, as applicable, to reconstruct the luma, Cb and Cr coding blocks of the CU. For example, the summer 80 can add samples of the luma, Cb and Cr transform blocks to corresponding samples of the predictive luma, Cb and Cr blocks to reconstruct the luma, Cb and Cr coding blocks of the CU.

The filter module 84 can be a deblocking filter, for example, and perform a deblocking operation to reduce blocking artifacts associated with the luma, Cb and Cr coding blocks of the CU. The video decoder 30 can then store the luma, Cb and Cr coding blocks of the CU in decoded picture buffer 82. The decoded picture buffer 82 can provide reference pictures for subsequent motion compensation, intra prediction, and presentation on a display device, such as display device 32 of FIG. 1. For example, the video decoder 30 can perform intra prediction or inter prediction operations on PUs of other CUs based on the luma, Cb and Cr blocks in decoded picture buffer 82. Thus, the video decoder 30 can decode, from the bitstream, transform coefficient levels of the significant luma coefficient block, inverse quantize the transform coefficient levels, apply a transform to the transform coefficient levels to generate a transform block, generate, based at least in part on the transform block, a coding block, and output the coding block for display.

Order of Parameter Sets

An RBSP is a syntax structure containing an integer number of bytes that is encapsulated in a NAL unit and that is either empty or has the form of a string of data bits containing syntax elements.

A PPS RBSP includes parameters that can be referred to by the coded slice segment NAL units of one or more coded pictures. Each PPS RBSP is initially considered not active for the base layer at the start of the operation of the decoding process. At most one PPS RBSP is considered active for the base layer at any given moment during the operation of the decoding process, and the activation of any particular PPS RBSP for the base layer results in the deactivation of the previously-active PPS RBSP for the base layer (if any).

When a PPS RBSP is not active for the base layer and it is referred to by a coded slice segment NAL unit with nuh_layer_id equal to 0, it is activated for the base layer. This PPS RBSP is called the active PPS RBSP for the base layer until it is deactivated by the activation of another PPS RBSP for the base layer. A PPS RBSP, with that particular value of pps_pic_parameter_set_id, shall be available to the decoding process prior to its activation, included in at least one access unit with TemporalId less than or equal to the TemporalId of the PPS NAL unit or provided through external means, and the PPS NAL unit containing the PPS RBSP shall have nuh_layer_id equal to 0.

Any PPS NAL unit containing the value of pps_pic_parameter_set_id for the active PPS RBSP for a coded picture (and consequently for the layer containing the coded picture) shall have the same content as that of the active PPS RBSP for the coded picture, unless it follows the last VCL NAL unit of the coded picture and precedes the first VCL NAL unit of another coded picture.

An SPS RBSP includes parameters that can be referred to by one or more PPS RBSPs or one or more SEI NAL units containing an active parameter sets SEI message. Each SPS RBSP is initially considered not active for the base layer at the start of the operation of the decoding process. At most one SPS RBSP is considered active for the base layer at any given moment during the operation of the decoding process, and the activation of any particular SPS RBSP for the base layer results in the deactivation of the previously-active SPS RBSP for the base layer (if any).

When an SPS RBSP is not already active for the base layer and it is referred to by activation of a PPS RBSP for the base layer or, when vps_base_layer_internal_flag is equal to 1 and vps_base_layer_available_flag is equal to 1, is referred to by an SEI NAL unit containing an active parameter sets SEI message, it is activated for the base layer. This SPS RBSP is called the active SPS RBSP for the base layer until it is deactivated by the activation of another SPS RBSP for the base layer. An SPS RBSP, with that particular value of sps_seq_parameter_set_id, shall be available to the decoding process prior to its activation, included in at least one access unit with TemporalId equal to 0 or provided through external means, and the SPS NAL unit containing the SPS RBSP shall have nuh_layer_id equal to 0. An activated SPS RBSP for the base layer shall remain active for the entire coded video sequence (CVS).

Any SPS NAL unit with nuh_layer_id equal to 0 containing the value of sps_seq_parameter_set_id for the active SPS RBSP for the base layer for a CVS shall have the same content as that of the active SPS RBSP for the base layer for the CVS, unless it follows the last access unit of the CVS and precedes the first VCL NAL unit and the first SEI NAL unit containing an active parameter sets SEI message (when present) of another CVS.

A VPS RBSP includes parameters that can be referred to by one or more SPS RBSPs or one or more SEI NAL units containing an active parameter sets SEI message. Each VPS RBSP is initially considered not active at the start of the operation of the decoding process. At most one VPS RBSP is considered active at any given moment during the operation of the decoding process, and the activation of any particular VPS RBSP results in the deactivation of the previously-active VPS RBSP (if any).

When a VPS RBSP (with a particular value of vps_video_parameter_set_id) is not already active and it is referred to by activation of an SPS RBSP for the base layer, or is referred to by an SEI NAL unit containing an active parameter sets SEI message, it is activated. This VPS RBSP is called the active VPS RBSP until it is deactivated by the activation of another VPS RBSP. A VPS RBSP, with that particular value of vps_video_parameter_set_id, shall be available to the decoding process prior to its activation, included in at least one access unit with TemporalId equal to 0 or provided through external means, and the VPS NAL unit containing the VPS RBSP shall have nuh_layer_id equal to 0. An activated VPS RBSP shall remain active for the entire CVS.

Any VPS NAL unit containing the value of vps_video_parameter_set_id for the active VPS RBSP for a CVS shall have the same content as that of the active VPS RBSP for the CVS, unless it follows the last access unit of the CVS and precedes the first VCL NAL unit, the first SPS NAL unit and the first SEI NAL unit containing an active parameter sets SEI message (when present) of another CVS.

All constraints that are expressed on the relationship between the values of the syntax elements and the values of variables derived from those syntax elements in VPSs, SPSs and PPSs and other syntax elements are expressions of constraints that apply only to the active VPS RBSP, the active SPS RBSP for the base layer and the active PPS RBSP for the base layer. If any VPS RBSP, SPS RBSP and PPS RBSP is present that is never activated in the bitstream, its syntax elements shall have values that would conform to the specified constraints if it was activated by reference in an otherwise conforming bitstream.

During operation of the decoding process, the values of parameters of the active VPS RBSP, the active SPS RBSP for the base layer and the active PPS RBSP for the base layer are considered in effect. For interpretation of SEI messages, the values of the active VPS RBSP, the active SPS RBSP for the base layer and the active PPS RBSP for the base layer for the operation of the decoding process for the VCL NAL units of the coded picture with nuh_layer_id equal to 0 in the same access unit are considered in effect unless otherwise specified in the SEI message semantics.

Operation Points, Output Operation Points, Layer Sets, and Output Layer Sets

As used herein, an operation point is a bitstream created from another bitstream by operation of the sub-bitstream extraction process with another bitstream, a target highest temporal_ID, and a target layer identifier list as inputs. More specifically, "operation points" are sub-bitstreams that can be extracted from an original bitstream that is scalable temporally and/or with multiple layers and/or views. That is, an operation point is a bitstream that is created from another bitstream by operation of the sub-bitstream extraction process with the another bitstream, a target highest temporal ID, and a target layer identifier list as inputs. The bitstream includes one or more views, including the view(s) of the operation point. The target highest temporal_ID defines the temporal subset. The target layer list includes a set of layers: the set of layers to be decoded for an operation point, and the set of layers to be output for an output operation point. An output operation point is associated with, inter alia, a set of output layers, i.e., the layers identified in the output layer set, which are the layers that are to be output. In general, each bitstream can contain one or more output layer sets. Each output layer set can contain one or more output operation point. A bitstream conformance test is performed for each output operation points to ensure that the corresponding sub-bitstream is a conforming bitstream.

The term "layer set" is used to refer to a set of layers to be decoded. A "layer set" is similar to an operation point except that a layer set is not associated with a particular value of temporal ID. Rather, the temporal sub-layers present in the layers all pertain to the layer set. Similarly, a layer set can be said to be associated with the highest possible Temporal ID. Accordingly, the temporal sub-layers present in the layers all belong to the layer set. A layer set can be derived from a bitstream in the same way that an operation point can be derived from a bitstream, with the highest temporal ID being the highest possible value.

The term "output layer set" refers to a layer set for which the output layers are specified. Thus, while the set of layers to be decoded is specified as a layer set, the set of layers to be output is specified for an output layer set. In some examples, the output layer set identifies the corresponding layer set by including an index to the corresponding layer set, where the corresponding layer set identifies the layers to be decoded. In other examples, the output layer set identifies the corresponding layer set in some other manner.

Layers in the layer set not targeted for output may still be decoded, e.g., when used for inter-layer (or inter-view) prediction. The layers that are targeted for output are a subset of the layers that are to be decoded: one, some, or all of the layers to be decoded may be targeted for output. It should be understood that the term "subset" does not necessarily mean that the layer to be output is a strict subset of the layers to be decoded. That is, in some examples, layers to be decoded and the layer to be output are the same. Thus the distinction between an output layer set and an output operation point is similar to the distinction between a layer set and an operation point as described above.

The sub-bitstreams may be extracted from the bitstream based on values of layer identifiers (identifying the layers for the output operation point) and temporal sub-layer identifiers (identifying the temporal subset for the output operation point) that identify the output operation point of the bitstream. The output operation points can be signaled in a VPS within the bitstream. For each of the operation points, an operation point syntax structure specifies a set of layer identifiers used to identify network abstraction layer (NAL) units in the bitstream that belong to a sub-bitstream of a given operation point. In this way, NAL units that make up the sub-bitstream of the given output operation point may be extracted from the original bitstream based on the layer identifiers of the NAL units and the highest temporal ID associated with the output operation point. NAL units are the components of the coded video data; the coded video data is organized into NAL units.

Profile, Tier, Level Syntax

The profile_tier_level( ) syntax structure is a syntax structure that provides syntax information related to profiles, tiers, and levels. Profiles, tiers, and levels specify different conformance points for implementing the HEVC standard or an HEVC extension standard (e.g., SHVC, MV-HEVC) such that it is interoperable across various applications that may have similar functional requirements. In some examples, a profile can define a set of coding tools or algorithms that a codec can use to generate a conforming bitstream. A profile is a subset of the entire bitstream syntax specified by particular standard, HEVC for example. Within the bounds imposed by the syntax of a given profile it is still possible to require a very large variation in the performance of encoders and decoders depending upon the values taken by syntax elements in the bitstream such as the specified size of the decoded pictures. In many applications, it is may not be practical nor economic to implement a decoder (e.g., the video decoder 30) capable of dealing with all hypothetical uses of the syntax within a particular profile. Thus "tiers" and "levels" are also specified within each profile. A level of a tier is a specified set of constraints imposed on values of the syntax elements in the bitstream. These constraints may be simple limits on values. Alternatively they may take the form of constraints on arithmetic combinations of values (e.g. picture width multiplied by picture height multiplied by number of pictures decoded per second). A level specified for a lower tier is more constrained than a level specified for a higher tier.

In some examples, a tier and a level may place constraints on decoder (e.g., the video decoder 30) processing load and decoder memory capabilities. The level information can establish restrictions on processing of data. For example, the level information can include maximum sample rate, maximum picture size, maximum bit rate, and minimum compression ratio among other possibilities. The level information can also include capacities of the DPB and the coded picture buffer (CPB). The CPB holds compressed data prior to its decoding for data flow management purposes. The DPB holds decoded picture data.

High Efficiency Video Coding tiers and levels are constraints that define a High Efficiency Video Coding (HEVC) bitstream in terms of maximum bit rate, maximum luma sample rate, maximum luma picture size, minimum compression ratio, maximum number of slices allowed, and maximum number of tiles allowed. Lower tiers are more constrained than higher tiers and lower levels are more constrained than higher levels.

The HEVC standard defines two tiers: Main and High. The Main tier is a lower tier than the High tier. The tiers are implemented to handle applications that differ in terms of their maximum bit rate. The Main tier can accommodate many common applications have average bitrates while the High tier can accommodate more demanding applications.

The HEVC standard defines thirteen levels. A level is a set of constraints for a bitstream. For levels below level 4 only the Main tier is allowed. A video decoder 30 that conforms to a given tier/level is capable of decoding all bitstreams that are encoded for that tier/level and for all lower tiers/levels.

As described herein, the video coder (e.g., video encoder 20 or video decoder 30 (FIG. 1)) can transmit and receive profile, tier, and level syntax structures via the link 16. The video coder (e.g., the system 10) may also refer to one of the profile, tier, and level syntax structures for each of a plurality of output layer sets and decode video data of one or more of the output layer sets based on information from the profile, tier, and level syntax structure referred to for the OLS. For example, the video encoder 20 can refer to one of the profile, tier, and level syntax structures for each of a plurality of output layer sets and encode video data of one or more output layer sets based on information from the profile, tier, and level syntax structure referred to for the output layer set. The video decoder 30 may also refer to one of the profile, tier, and level syntax structures for each of a plurality of output layer sets and decode video data of one of the output layer sets based on information from the profile, tier, and level syntax structure referred to for the output layer set.

PTL information can be contained within profile_tier_level( ) syntax elements and conveyed via parameter sets (e.g., SPS, VPS). The profile_tier_level( ) syntax structure can provides the profile, tier, and level to which an OLS conforms and can be included in the VPS active for the OLS. In some examples, the PTL information is included in the VPS extension. When the profile_tier_level( ) syntax structure is included in a vps_extension( ) syntax structure, the profile_tier_level_idx[i] syntax element of the vps_extension( ) syntax structure specifies which profile_tier_level( ) syntax structure applies to the i-th OLS, where "i" is an integer layer. When the syntax num_add_layer_sets is greater than 0, and i is in the range of FirstAddLayerSetIdx to LastAddLayerSetIdx, inclusive, the profile_tier_level( ) syntax structure identified by profile_tier_level_idx[i] applies to the output of a non-base layer with the input variable lsIdx set equal to OlsIdxToLsIdx[i]. When the profile_tier_level( ) syntax structure is included in a VPS, but not in a vps_extension( ) syntax structure, it applies to the $0^{th}$ OLS. When the profile_tier_level( ) syntax structure is included in an active SPS for the base layer, it applies to the $0^{th}$ OLS. When the profile_tier_level( ) syntax structure is included in an active SPS for an independent non-base layer with nuh_layer_id equal to layerId, it applies to the $0^{th}$ OLS in an output bitstream of the non-base layer subtree extraction process with an input parameter lsIdx such that AssignedBaseLayerId[lsIdx] is equal to layerId.

Figure 4:
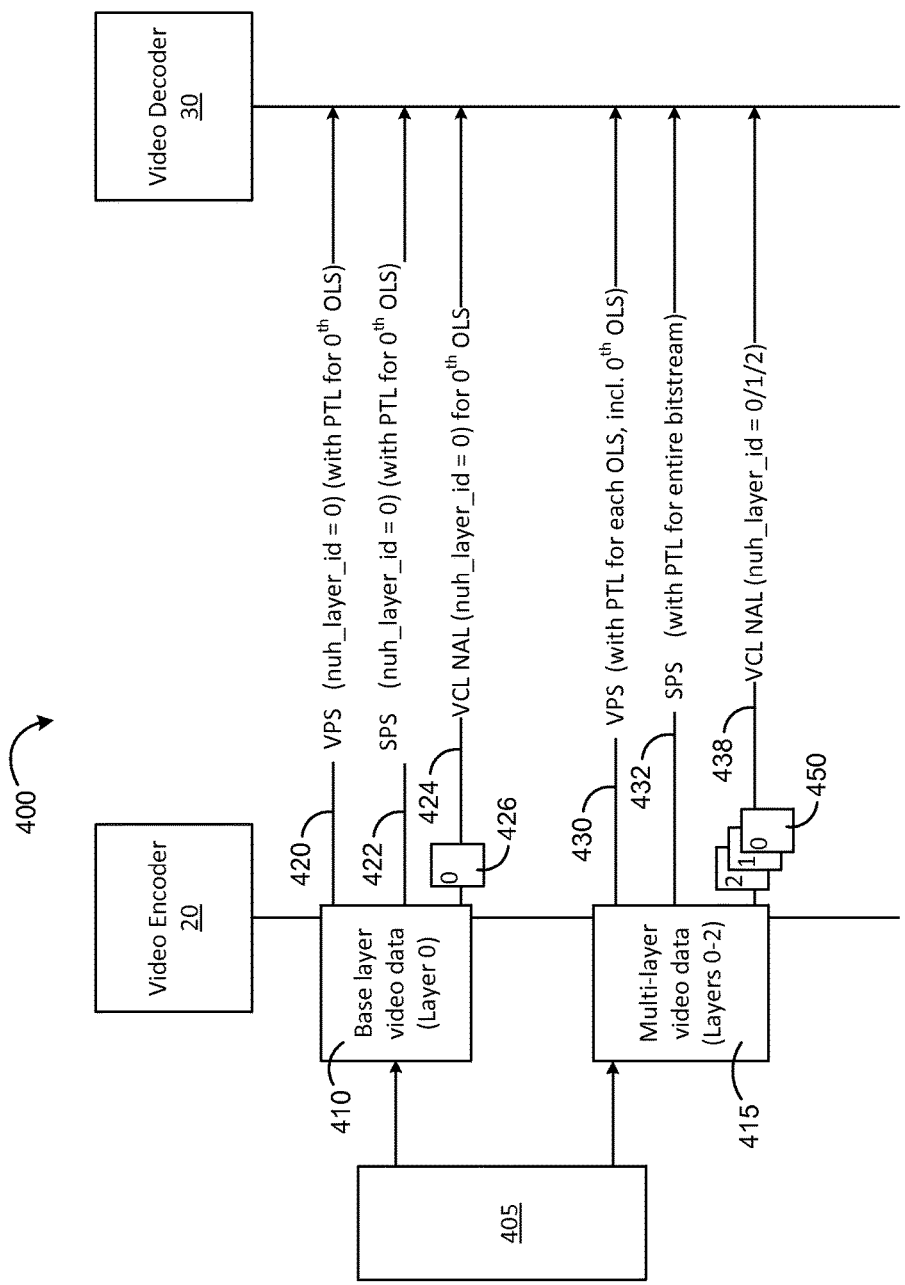
FIG. 4 is a signal flow diagram showing an exemplary signal flow between a video encoder and video decoder.

FIG. 4 is a signal flow diagram showing an exemplary signal flow between a video encoder and video decoder. A signal flow 400 is representative of the video encoder 20 receiving video data 405 from, for example, the video source 18. The video data 405 can include raw video information that the video encoder 20 can encode in a base layer (BL) or layer 0, and one or more non-base layers, or enhancement layers (EL). In some examples, the video encoder 20 can encode the video data 405 as base layer video data 410 (e.g., layer 0), and multi-layer video data 415 (e.g., layers 0-2). The video encoder 20 can receive the video data 405 for encoding and transmission to the video decoder 30.

In some embodiments, the video encoder 20 can signal a VPS 420 with a nuh_layer_id equal to zero (0) that includes a profile, tier, and level information for a base layer of video data. The nuh_layer_id can be used to indicate a corresponding layer of video data. Accordingly, the VPS 420 can be termed the "active VPS," until supplanted by a following or next VPS. A layer can be a set of VCL NAL units that have a particular value of nuh_layer_id and the associated non-VCL NAL units. The nuh_layer_id can be equal to 0 in a bitstream containing only one layer, such as, for example, the base layer or the $0^{th}$ OLS. The nuh_layer_id can also equal 0 in all NAL units of the base layer. Other values of nuh_layer_id may appear in bitstreams containing multiple layers such as, for example, the multilayer video data 415.

The video encoder 20 can transmit the VPS 420 with a nuh_layer_id equal to 0. In such an example, the VPS 420 can include the profile, tier, and level syntax structure for the base layer video data 410, or a $0^{th}$ OLS 426 because the base layer is the only content of the bitstream and therefore the only output layer. The video decoder 30 can receive the VPS 420 with the nuh_layer_id equal to 0, wherein the VPS includes a profile, tier, and level syntax structure for the base layer video data 410 and used the PTL information to decode the $0^{th}$ OLS 426.

The video encoder 20 can also transmit a SPS 422 with a nuh_layer_id equal to 0, referencing the VPS 420 and indicating PTL information for the base layer video data 410. The video encoder 20 can further transmit VCL NAL units 424 including the encoded video data 405. In some embodiments, the VCL NAL units 424 can be representative of the entire bitstream having only the base layer (layer 0) as the output, for example the $0^{th}$ OLS 426. The video decoder 30 can then reference the VPS 420 for decoding the $0^{th}$ OLS 426. In some embodiments, the VPS 420 and the SPS 422 can be referred to as the "active" SPS or active VPS if the PTL information each contains is currently being referenced to decode the video data 405 that is received at the video decoder 30. In some examples, an SPS (e.g., the SPS 422) contains either zero or one PTL syntax structure, while a VPS can contain multiple PTL syntax structures, for example, one for each layer.

In such an embodiment, the $0^{th}$ OLS specified by the active VPS refers to the OLS that contains only the base layer video data 410 (the layer with nuh_layer_id equal to 0), which is also the only output layer. Accordingly, when the entire bitstream contains only the base layer video data 410, the tier and level information of the 0th OLS 426 is signaled in the profile_tier_level( ) syntax structure of the active SPS 420 as well as in the first profile_tier_level( ) syntax structure in the active VPS 422.

In some embodiments, a similar process can be used for encoding multi-layer video data 415. The video encoder 20 can signal a VPS 430. The VPS 430 can include PTL information for each OLS in the bitstream. For example, the PTL information can be included for a 0th OLS 450, a 1-th OLS, or a 2-th OLS. The video encoder 20 can also signal a SPS 432 including PTL information for the entire bitstream (e.g., the video data 415). The video encoder 20 can then transmit VCL NAL units 438 having one or more OLSs identified in the VPS 430. Because the VPS 430 contains PTL information for each OLS in the bitstream, the video decoder 30 can reference the VPS 430 and receive PTL information for a 0th OLS 450 when decoding the bitstream.

In some embodiments, the vps_extension( ) of syntax structure, of for example the VPS 430, can include PTL syntax information for the $0^{th}$ OLS. Accordingly, the PTL information for the $0^{th}$ OLS can be implemented at the beginning of the VPS extension, as shown below. This can improve the efficiency of the VPS extension providing the necessary PTL information at the appropriate level and diminishing extra signaling to receive such PTL information when it is not included. Table 1 shows the syntax elements that can be included in the VPS extension when such conditions exist.

Certain additions to the vps_extension( ) syntax structure can include the following syntax elements, as listed in Table 1.

TABLE 1

| Example portion of the VPS syntax | |
|---|---|
| vps_extension( ) { | Descriptor |
| ... | |
| NumOutputLayerSets = num_add_olss + NumLayerSets | |
| for( i = vps_base_layer_internal_flag ? | |
| 0 : 1; i < NumOutputLayerSets; i++ ) { | |
|   if( i >= NumLayerSets ) | |
|     layer_set_idx_for_ols_minus1[ i ] | u(v) |
|   if( i > vps_num_layer_sets_minus1 \|\| | |
|   ( defaultOutputLayerIdc == 2 && i > 0 ) | |
|     for( j = 0; j < NumLayersInIdList | |
|     [ OlsIdxToLsIdx[ i ] ]; j++) | |
|       output_layer_flag[ i ][ j ] | u(1) |
|   profile_level_tier_idx[ i ] | u(v) |
|   if( NumOutputLayersInOutputLayerSet[ i ] == 1 | |
|     alt_output_layer_flag[ i ] | u(1) |
| } | |
| ... | |
| } | |

As shown in Table 1, the vps_extension( ) syntax can incorporate the term, "for(i=vps_base_layer_internal_flag ? 0: 1; i<NumOutputLayerSets; i++)" and "if (i>vps_num_layer_sets_minus1||(defaultOutputLayerIdc==2 && i>0)" in order to include PTL information for the $0^{th}$ OLS. This can ensure that even though the bitstream contains more than the base layer (e.g., multilayer video data 415), and more than one OLS (e.g., the $0^{th}$, 1-th, and 2-th OLS), the tier and level information is always signaled for the $0^{th}$ OLS.

Figure 5:
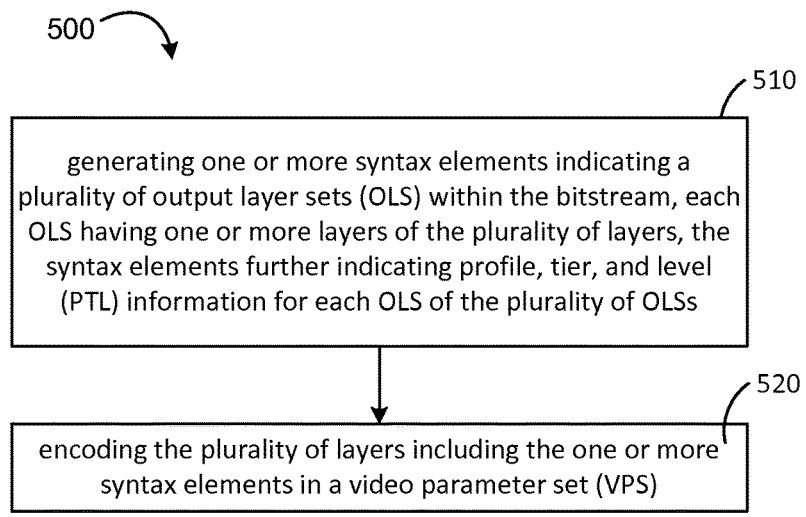
FIG. 5 is a flowchart of a method for encoding a bitstream.

FIG. 5 is a flowchart of a method for encoding a bitstream. At block 510, generate one or more syntax elements for inclusion in a VPS, indicating a plurality of output layer sets (OLS) within a bitstream. The syntax elements can also be included in the extension part of the VPS (e.g., the VPS 430). Each OLS can have one or more layers of the plurality of layers. The syntax elements can indicate profile, tier, and level (PTL) information for each OLS of the plurality of OLSs contained in the bitstream.

At block 520, the video encoder 20 can encode the plurality of layers including the syntax elements within the VPS (e.g., the VS 430). In this way, the method 500 can be used to signal profile, tier, and level information for each OLS of a bitstream, including PTL information for the $0^{th}$ OLS, in the VPS extension.

Figure 6:
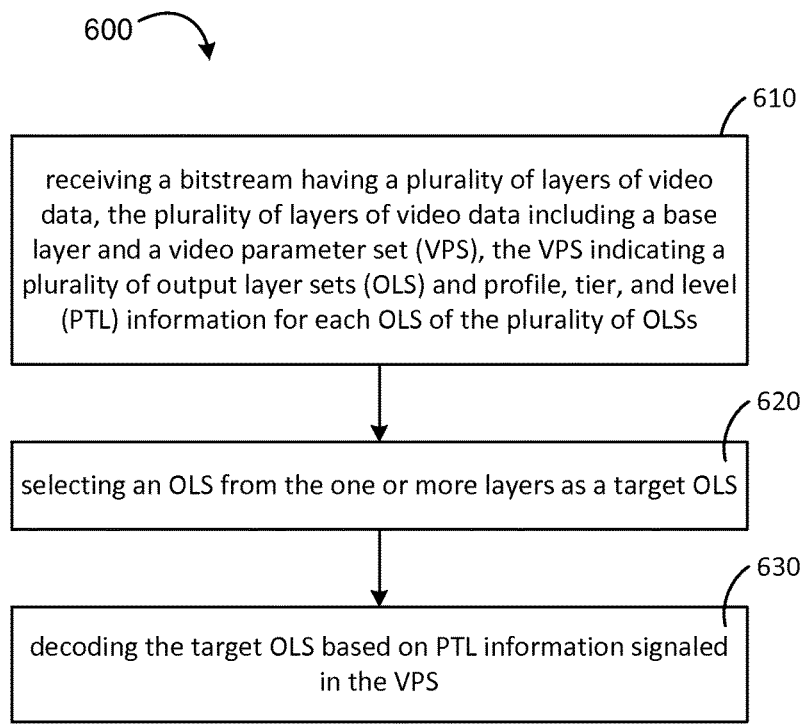
FIG. 6 is a flowchart of a method for decoding a bitstream.

FIG. 6 is a flowchart of a method for decoding a bitstream. A method 600 begins at block 610 when the video decoder 30 receives a bitstream having a plurality of layers of video data. The bitstream can include the multi-layer video data 415 (FIG. 4). The plurality of layers of video data can also include a base layer and a VPS (e.g., the VPS 430). The VPS can indicate the present of a plurality of OLS and profile, tier, and level (PTL) information for each OLS of the plurality of OLSs.

At block 620, the video decoder 30 can select one of the OLSs as a target OLS for decoding. Then at block 630, the video decoder 30 can decode the target OLS using the PTL information signaled in the active VPS (e.g., the VPS 430). Accordingly, the method 600 can provide a method by which the video decoder 30 can use optimal PTL information for each OLS contained in the bitstream (e.g., the $0^{th}$ OLS, the 1-th OLS, and the 2-th OLS).

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods described herein may be implemented in hardware, software, firmware, or any combination thereof. Such methods may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the methods may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The methods additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the methods described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the methods described herein. In addition, in some aspects, the functionality described herein may be provided within dedicated software modules or hardware modules configured for encoding and decoding, or incorporated in a combined video encoder-decoder (CODEC).

The coding methods discussed herein may be embodiment in an example video encoding and decoding system. A system includes a source device that provides encoded video data to be decoded at a later time by a destination device. In particular, the source device provides the video data to destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source device and the destination device may be equipped for wireless communication.

Although embodiments of the disclosure are described above for particular embodiment, many variations of the disclosure are possible. For example, the numbers of various components can be increased or decreased, modules and steps that determine a supply voltage can be modified to determine a frequency, another system parameter, or a combination of parameters. Additionally, features of the various embodiments can be combined in combinations that differ from those described above.

Those of skill will appreciate that the various illustrative blocks and modules described in connection with the embodiment disclosed herein can be implemented in various forms. Some blocks and modules have been described above generally in terms of their functionality. How such functionality is implemented depends upon the design constraints imposed on an overall system. Skilled persons can implement the described functionality in varying ways for each particular application, but such implementation decisions should not be interpreted as causing a departure from the scope of the disclosure. In addition, the grouping of functions within a module, block, or step is for ease of description. Specific functions or steps can be moved from one module or block or distributed across to modules or blocks without departing from the disclosure.

The above description of the disclosed embodiment is provided to enable any person skilled in the art to make or use the subject matter of the disclosure. Various modifications to these embodiments will be readily apparent to those skilled in the art, and the generic principles described herein can be applied to other embodiment without departing from the spirit or scope of the disclosure. Thus, it is to be understood that the description and drawings presented herein represent a presently preferred implementation of the disclosure and are therefore representative of the subject matter which is broadly contemplated by the present disclosure. It is further understood that the scope of the present disclosure fully encompasses other embodiment that may become obvious to those skilled in the art and that the scope of the present disclosure is accordingly limited by nothing other than the appended claims.

What is claimed is:

1. A method for encoding a bitstream having a plurality of layers of video data, the plurality of layers of video data including a base layer, the method comprising:
   generating one or more syntax elements indicating a plurality of output layer sets (OLS) within the bitstream, each OLS having one or more layers of the plurality of layers, the one or more syntax elements further indicating profile, tier, and level (PTL) information for each OLS of the plurality of OLSs; and
   encoding the plurality of layers including the one or more syntax elements in a video parameter set (VPS).

2. The method of claim 1, wherein the VPS indicates PTL information for the $0^{th}$ OLS.

3. The method of claim 2, wherein the PTL information for the $0^{th}$ OLS is included in a VPS extension part of the VPS.

4. A device for encoding a bitstream having a plurality of layers of video data, the plurality of layers of video data including a base layer, the device comprising:
   a memory configured to store the plurality of layers of video data; and
   at least one processor operably coupled to the memory and configured to
   generate one or more syntax elements indicating a plurality of output layer sets (OLS) within the bitstream, each OLS having one or more layers of the plurality of layers, the one or more syntax elements further indicating profile, tier, and level (PTL) information for each OLS of the plurality of OLSs, and
   encoding the plurality of layers including the one or more syntax elements in a video parameter set (VPS).

5. The device of claim 4 wherein the at least one processor is further configured to indicate PTL information for the $0^{th}$ OLS in the VPS.

6. The device of claim 5 wherein the at least one processor is further configured to indicate the PTL information for the $0^{th}$ OLS in a VPS extension part of the VPS.

7. A method for decoding video data comprising:
   receiving a bitstream having a plurality of layers of video data, the plurality of layers of video data including a base layer and a video parameter set (VPS), the VPS indicating a plurality of output layer sets (OLS) and profile, tier, and level (PTL) information for each OLS of the plurality of OLSs;
   selecting an OLS from the one or more layers as a target OLS, and
   decoding the target OLS based on PTL information signaled in the VPS.

8. The method of claim 7 wherein the target OLS is a $0^{th}$ OLS and the VPS includes PTL information for the $0^{th}$ OLS.

9. The method of claim 8 wherein the PTL information for the $0^{th}$ OLS is included in a VPS extension of the VPS.

10. A device for decoding video data comprising:
    a memory configured to store a bitstream having a plurality of layers of video data, the plurality of layers of video data including a base layer and a video parameter set (VPS), the VPS indicating a plurality of output layer sets (OLS) and profile, tier, and level (PTL) information for each OLS of the plurality of OLSs; and
    at least one processor operably coupled to the memory and configured to
    select an OLS from the one or more layers as a target OLS, and
    decoding the target OLS based on PTL information signaled in the VPS.

11. The device of claim 10 wherein the target OLS is a $0^{th}$ OLS and the VPS includes PTL information for the $0^{th}$ OLS.

12. The device of claim 11 wherein the PTL information for the $0^{th}$ OLS is included in a VPS extension of the VPS.

* * * * *